Sept. 22, 1925.
C. H. BUSS
1,554,331
COMBINED BUMPER AND FENDER BRACE
Filed June 5, 1925
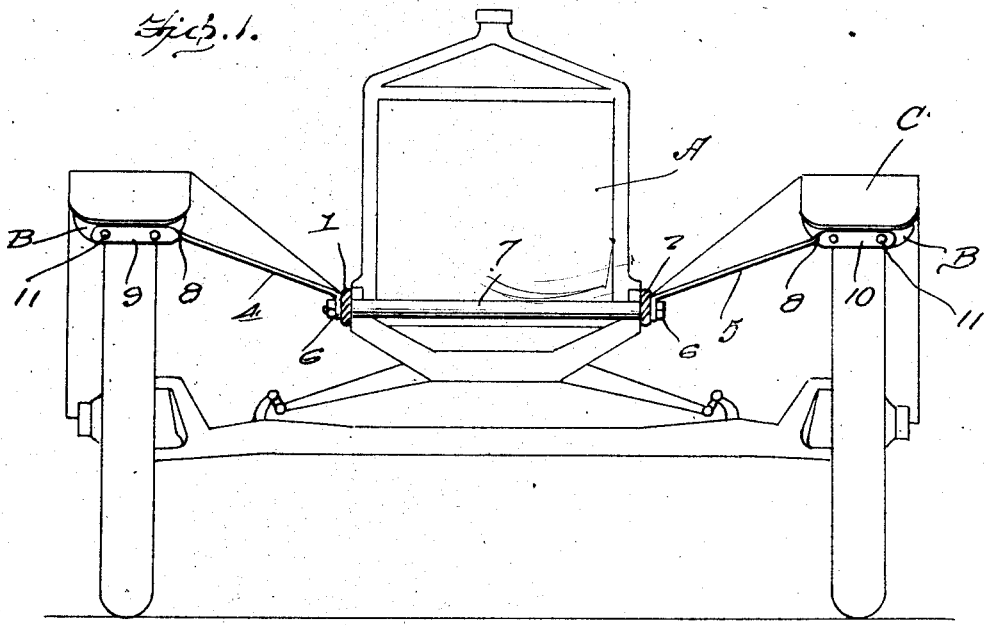
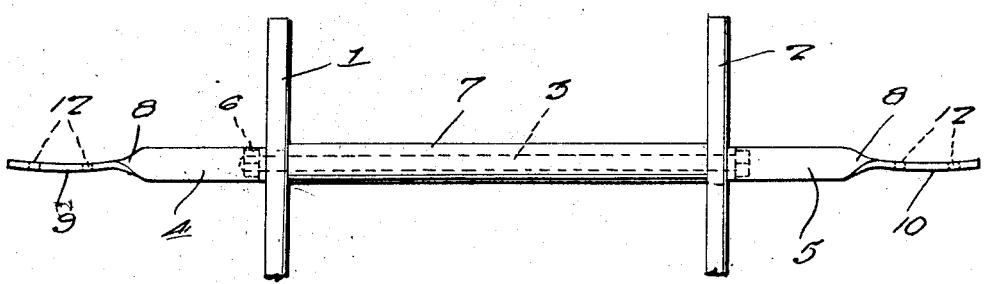
Inventor
C. H. Buss
By Clarence A. O'Brien
Attorney Patented Sept. 22, 1925.

1,554,331

UNITED STATES PATENT OFFICE.

CHESTER H. BUSS, OF PARK RAPIDS, MINNESOTA.

COMBINED BUMPER AND FENDER BRACE.

Application filed June 5, 1925. Serial No. 35,138.

*To all whom it may concern:*

Be it known that I, CHESTER H. BUSS, a citizen of the United States, residing at Park Rapids, in the county of Hibbard and State of Minnesota, have invented certain new and useful Improvements in a Combined Bumper and Fender Brace, of which the following is a specification.

This invention relates to a highly novel means for bracing the fenders of an automobile, and is more particularly adapted to be used in conjunction with the fenders of a Ford automobile, the device being further adapted to brace the securing arm of a bumper which is adapted to be supported on the forward end of an automobile in any well known manner.

A further object of the invention is to provide a combined fender and bumper brace of the above mentioned character which may be readily and easily installed without necessitating any material alterations of the parts with which it is associated.

A still further object is to provide a device of the above mentioned character which will prevent and eliminate any undue vibration of either the fenders or the bumper securing arms while the automobile is in operation.

Another object is to provide a device of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the same:

Figure 1 is a front elevation of an automobile of the Ford type showing my improved brace mounted thereon, the bumper securing arms being shown in section, and Figure 2 is a top plan view of the device embodying the present invention.

In the drawing wherein for the purpose of illustration is shown the preferred embodiment of my invention, the numerals 1 and 2 designate the free end portions of the securing arms of any well known type of bumper, the free ends of these arms being adapted to be secured to the sides of the chassis of an automobile, preferably of the Ford type, in the usual manner. These bumper securing arms are provided with a pair of registering openings through which extend the rod 3, the openings being formed in the bumper securing arms 1 and 2 at points whereby the rod 3 will be disposed forwardly of the base of the radiator A. The respective ends of the rod 3 are threaded and the threaded ends extend through the inner downwardly disposed ends of the arms 4 and 5 respectively, suitable nuts 6 being threaded on the outer threaded ends of the rod for securing the downwardly disposed inner ends of the arms in position on the rod and to further prevent the accidental displacement of the rod from the bumper securing arms.

Encircling the rod 3 and disposed between the inner side of the bumper securing arms 1 and 2 is the sleeve 7, the same providing a means for bracing the bumper securing arm and preventing any undue vibration of the same.

Each of the arms 4 and 5 is formed of an elongated flat strip of metal, the arms diverging upwardly and being twisted adjacent their respective outer ends as illustrated at 8. In this manner, the outer ends 9 and 10 of the arms 4 and 5 respectively will be disposed in a plane substantially at right angles to the arms. The arms are of such length as to permit the outer ends thereof to engage the forward portions of the depending flanges B formed on the front fenders C and as is shown more clearly in Figure 2, the outer ends of each of the arms are curved to conform to the shape of the forward end portion of the depending flange of each of the fenders whereby the outer ends of the arms may be secured thereto by the fastening means shown at 11, it being understood of course that the outer ends of the arms are provided with suitable openings 12 for receiving the fastening means. Also the depending flanges B are provided with openings adapted to register with the openings 12 in the outer ends of the arms.

With the parts of my invention secured on an automobile in the manner as above described, and as shown in Figure 1, the fenders as well as the bumper securing arms will be supported and braced so as to prevent and eliminate any undue vibration caused while the automobile is in operation.

The simplicity with which the present device is constructed enables the same to be readily and easily installed and will not affect the appearance of the automobile.

While I have shown the preferred embodiment of my invention it is to be understood that minor changes in the size, shape, and arrangement of parts may be resorted to without departing from the spirit of the invention, and the scope of the appended claims.

Having thus described the invention, what I claim as new and desire to secure by Letters Patent is:—

1. In combination with an automobile including front fenders, and bumper securing arms adapted to be attached to the chassis of the automobile, of a brace comprising a rod extending transversely to said arms, a pair of bracing arms secured at their inner ends to the respective ends of said rod, and at their outer ends to the respective fenders.

2. In combination with an automobile including bumper securing arms which are adapted to be attached to the chassis of the automobile, of a brace therefor comprising a rod extending transversely through said arms, a sleeve encircling said rod and having the ends thereof in engagement with the inner faces of the arms, the outer ends of the rod being threaded, and nuts threaded thereon.

3. In combination with an automobile including bumper securing arms which are adapted to be attached to the chassis of the automobile, of a brace therefor comprising a rod extending transversely through said arms, a sleeve encircling said rod and having the ends thereof in engagement with the inner faces of the arms, the outer ends of the rod being threaded, nuts threaded thereon, and means for bracing the fenders of the automobile.

4. In combination with an automobile including bumper securing arms which are adapted to be attached to the chassis of the automobile, of a brace therefor comprising a rod extending transversely through said arms, a sleeve encircling said rod and having the ends thereof in engagement with the inner faces of the arms, the outer ends of the rod being threaded, nuts threaded thereon, and means for bracing the fenders of the automobile, said means comprising a pair of bracing arms, the inner ends thereof being secured on the respective ends of the rod, the outer ends of the bracing arms being secured to the respective fenders.

5. In combination with an automobile including front fenders, and bumper securing arms which are adapted to be attached to the chassis of the automobile, of bracing means therefor comprising a rod extending transversely through said arms, a sleeve encircling the rod and disposed between said arms, a pair of bracing arms secured at their inner ends to the respective ends of the rod, securing nuts threaded on the outer ends of the rod, the outer ends of the bracing arms being twisted and bent to conform to the shape of the front fenders to which the same are secured.

In testimony whereof I affix my signature.

CHESTER H. BUSS.